United States Patent [19]
Wrobel

[11] 3,772,544
[45] Nov. 13, 1973

[54] TRACTION RELIEF ARRANGEMENT FOR CORDS OF SMALL SIZE ELECTROMOTORS

[75] Inventor: Günter Wrobel, Villingen, Germany

[73] Assignee: Firma Papst-Motorem KG, St. Georgen/Sch., Germany

[22] Filed: June 8, 1972

[21] Appl. No.: 260,821

[30] Foreign Application Priority Data
July 20, 1971 Germany.................. P 21 36 170.6

[52] U.S. Cl.......................... 310/71, 310/67, 310/85
[51] Int. Cl. ............................................ H02k 11/00
[58] Field of Search...................... 310/71, 214, 85, 310/67, 40 MM, 89, 266

[56] References Cited
UNITED STATES PATENTS

| | | | |
|---|---|---|---|
| 3,624,433 | 11/1971 | Jaeschke | 310/67 |
| 3,050,647 | 8/1962 | Winther | 310/67 |
| 3,388,273 | 6/1968 | Davis | 310/67 |
| 3,293,463 | 12/1966 | Church | 310/71 |
| 3,462,626 | 8/1969 | Kluss | 310/67 |
| 3,002,118 | 9/1961 | Papst | 310/67 |
| 3,482,806 | 12/1969 | Trautzsch | 310/67 |
| 3,555,382 | 1/1971 | Miyasaka | 310/67 |
| 3,148,294 | 9/1964 | Jaeschke | 310/266 |

Primary Examiner—R. Skudy
Attorney—John J. McGlew et al.

[57] ABSTRACT

The motor has a stator including a magnetic structure formed with axially extending slots and stator coils extending in the slots, and an external rotor rotatably surrounding the stator. The stator structure includes an element defining, at one axial end of the stator, uniformly angularly spaced cavities receiving the respective terminal ends of the stator coils. A supply cord extends through at least one of the slots from one axial end to the other and has the terminal ends of its conductors bent at at least 90° to the axis of the stator and inserted into the cavities, and connected therein to the terminal ends of said stator coils, by clamping plates. In one embodiment of the invention, the element is a winding cover plate having radially outwardly opening cavities. In another embodiment of the invention, the winding cover plate has a bendable flap which can be bent over the cord to prevent the terminal ends of the conductors being extracted from the cavities. In a third embodiment of the invention, the element is an insulating sleeve defining cavities extending axially, and the cord is bent around this sleeve with the terminal ends of its conductors extending into the cavities. In each case, the cord extends into the stator through an opening in a base plate and then through the axial slot, with the cord being maintained firmly in the slot by an insulating blade or the like.

13 Claims, 8 Drawing Figures

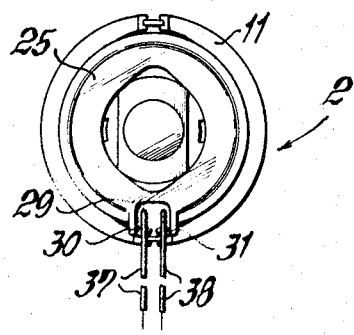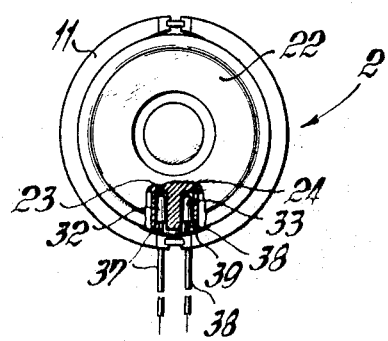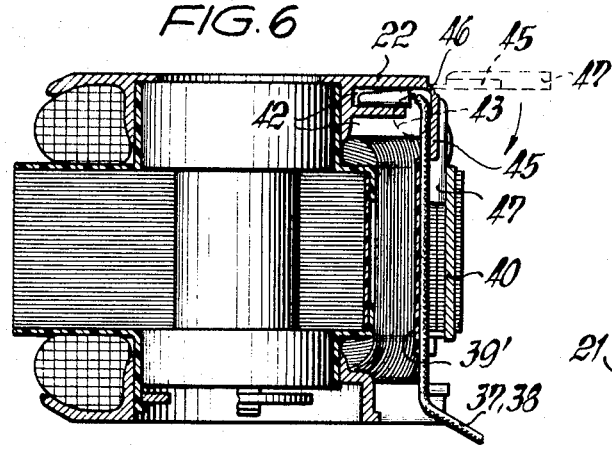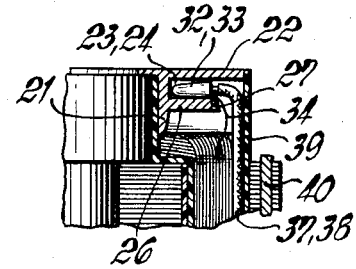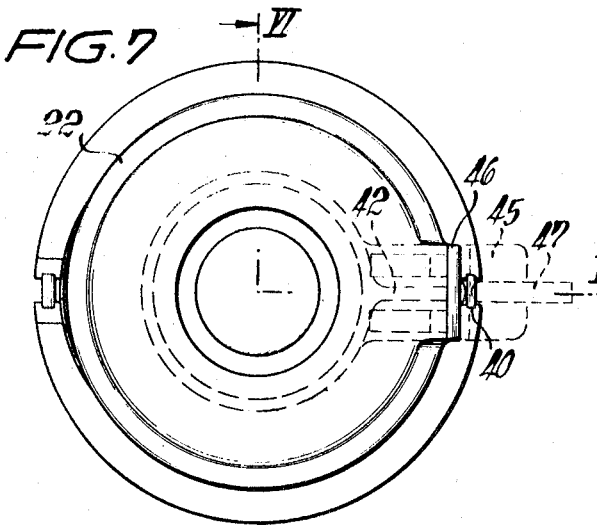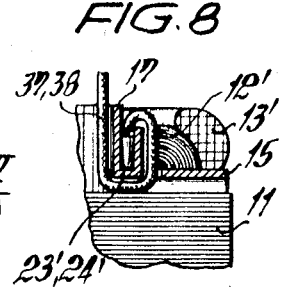

3,772,544

TRACTION RELIEF ARRANGEMENT FOR CORDS OF SMALL SIZE ELECTROMOTORS

BACKGROUND OF THE INVENTION

1. Field of the Invention

This invention relates in general to the construction of electric motors and, in particular, to a new and useful external rotor-type motor having a winding coverplate for the stator with pockets into which a connecting cord is directed and held therein with its end angled off to prevent cord traction.

2. Description of the Prior Art

In the construction of electric motors, particularly small size electric motors, it is necessary to prevent removal of the connection cords or wires to the motor by any traction load or other types of mechanical stress and this is true particularly at the junctions between the winding coil ends and the cord ends. In order to avoid disruption of the connection between the connecting cords and the coil ends, the ends of the stator winding are provided, in a known motor construction with an external rotor, with turned-up insulating sheath which are subsequently pushed from the end face into a cavity defined between the winding spools. The cords are either tied or adhesively secured on the windings for their traction release and they are conducted axially through a cavity formed between the windings in the stator body. On the opposite end face of the stator, the cords are connected radially out of the respective cavity in an arc of varying radius. This type of traction relief is cumbersome and expensive to produce since the connecting cords which are connected to the winding ends must be provided with an additional insulating sheath. In addition, the known arrangement for the traction relief of the connections of the cord with the stator winding ends are not safe enough. This is particularly true when the cords are subjected to intensive heating in which case they tend to become detached.

SUMMARY OF THE INVENTION

In accordance with the present invention, there is provided a new arrangement for the traction relief of the connection of cords with the stator winding coil ends of small electric motors particularly, motors of the external rotor type. With the inventive construction, the disadvantages of the prior art are overcome and a simpler and cheaper construction is provided. For this purpose, the cord ends are connected with the winding coil ends in a pocket-type cavity of a part which is secured on the stator, for example, a stator coverplate. The pocket is oriented so that the cords may be bent off at an angle to the direction of removal of the cord under traction. The construction makes it possible to eliminate the necessity of fastening the cord by means of tapes or varnish on the winding coil which emerge from the stator body at the end face thereof. The construction of the invention also avoids the requirement that the cord ends connected to the winding ends be provided with insulating sheaths. The pocket-type cavities defined in the end plate or coverplate of the stator provide a receiving cavity which ensures that the cord ends may be properly insulated from each other without additional means and in order to ensure phase separation. By a construction in which the cords are directed axially along the stator and then have their ends bent off sharply and inserted into the pocket-type cavities, the tractive forces which act on the cords are absorbed by the walls of the cavity without the forces being applied to the sensitive junctions themselves. The arrangement is of very simple construction and is inexpensive both from assembly and part cost standpoints.

In the preferred arrangement, the cord ends connected to the winding ends are stiffened by metal clamp plates or by other suitable means.

With the arrangement, the cord ends show not only a good stability as to form but the clamp plates ensure that a good electrical and mechanical connection between the cord ends and the winding wire ends of the coil can be produced. The construction also makes it possible to shape the cord ends in a mass production operation without difficulty and while still maintaining a good fit in the pocket-type cavities.

In accordance with another feature of the invention, the cavities are provided with portions which define inwardly pointing projections which bear on the tapes of the pocket-type cavities which extend beyond the clamp plates. This ensures a good anchoring of the cord ends and the winding ends in the cavities.

Accordingly, it is an object of the invention to provide an improved electric motor construction which includes a stator having a stator core with windings which are connected to a connecting cord which extends axially along the windings and includes a terminal end extending at a sharp angle to the cord which is directed into a pocket formation formed in the stator housing and which is electrically connected to the coil ends in the pocket formation.

A further object of the invention is to provide an electric motor having an improved means for anchoring the connecting cord ends for connection to the coil winding ends which ensures the holding of the cord ends against traction without damage to the other motor parts.

A further object of the invention is to provide an electric motor construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a bottom plan view of the stator shown in FIG. 1 a reduced scale;

FIG. 4 is a top plan view of the stator partly broken away;

FIG. 5 is a fragmentary perspective view similar to FIG. 1 of a portion of the motor shown in FIG. 1;

FIG. 6 is a view similar to FIG. 1 of another embodiment of the invention and taken along the line A—A VI—VI of FIG. 7;

FIG. 7 is a partial top plan view of the stator shown in FIG. 6; and

FIG. 8 is a view similar to FIG. 5 showing a still further embodiment of the invention.

GENERAL DESCRIPTION OF THE PREFERRED EMBODIMENTS

Figure 1:
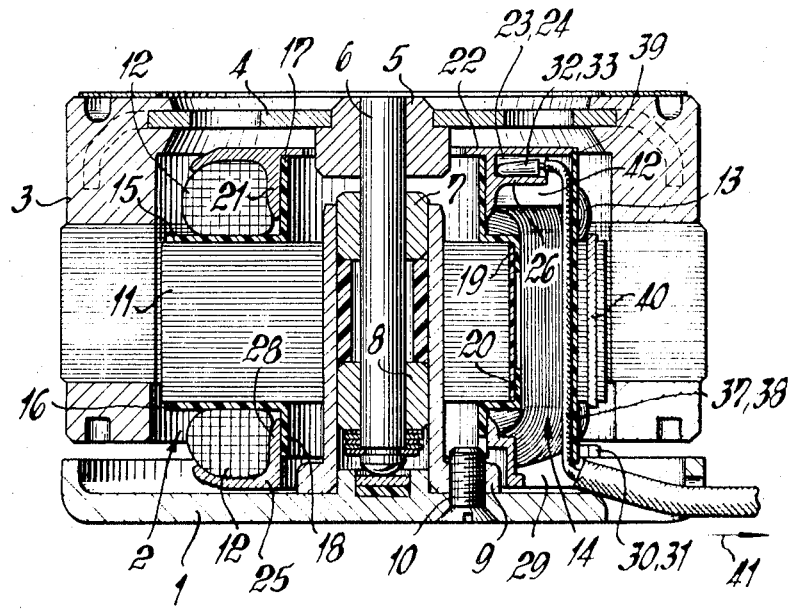
FIG. 1 is a transverse sectional view of a shaded pole motor of the external rotor type constructed in accordance with the invention.

Referring to the drawings in particular, the invention embodied therein in FIGS. 1 to 5, comprises an external rotor type shaded pole motor having a stator 2 secured on a base plate 1 and a cylindrical external rotor 3. The external rotor 3 is secured by means of a plate 4 which is carried on a bushing 5 which is affixed to a shaft 6 for rotation therewith. The shaft 6 is arranged in two vertically spaced rotatably mounted bearing bushes 7 and 8 which are carried in a flanged tube 9 of the stator 2. The flanged tube 9 is connected with the base plate 1 by screws 10 and it carries a pressed on stack of stampings or laminations 11 of the winding core. The stack stampings have two axially extending grooves on respective diametrically opposite sides which receive winding spools 12 and 13. In FIG. 1, only one axial groove 14 of the stampings 11 is indicated. In order to avoid contact between the winding spools 12 and 13 and the stack of stampings 11, the construction includes an insulating disc 15 arranged at one end of the stampings and another disc 16 arranged at the opposite end. Each disc 15 and 16 includes axially outwardly directed tubular extensions 17 and 18, respectively, which extend, along with pedestals 19 and 20 into respective axial grooves, as indicated at the right-hand portion of FIG. 1.

A disc-type winding coverplate or endplate 22 is engaged over the hollow cylindrical extension 17 and secured by means of a conical hub portion which fits over the extension 17. The plate 22 covers the winding spools 12 and 13 on the upper end face. The winding cover plate is provided with two juxtaposed pocket-type cavities 23 and 24 which open radially outwardly and which are located above the slot 14 of the stack of stampings 11 of the stator 2. An insulating wall 42 separates cavities 23 and 24. As best seen in FIG. 5, the cavities 23 and 24 have bottom walls 26 which carry upwardly directed projection fins 27.

On the bottom end face of the stator 2, the winding spools 12 and 13 are covered by a winding cover plate or endplate 25, having a conical hub portion 28 which is secured over the extension 18 of the bottom insulating disc 16. The bottom winding coverplate has, at the point underneath the slot 14, an opening 29 which is bounded on its radial outer side by two inwardly facing opposed noses 30 and 31.

Figure 2:
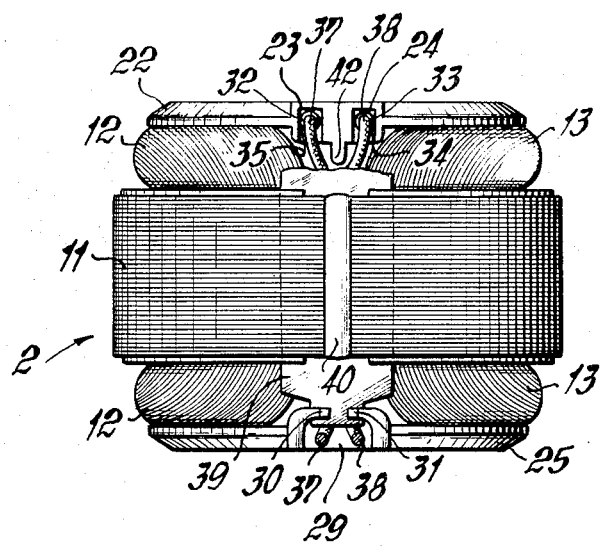
FIG. 2 is a side elevational view of the stator of the motor shown in FIG. 1.

In accordance with the invention, a connecting cable includes connecting cords or wires 37 and 38 which have end terminals which are bent off or angled into the pocket-type cavities 23 and 24 of the top winding coverplate 22. The cords 37 and 38 are connected by means of clamp plates 32 and 33, as best seen in FIGS. 2 and 4, at their terminal ends to winding ends 34 and 35 which are also directed into the cavities 23 and 24 and looped over the ends of the clamp plates 32 and 33. The cords 37 and 38 are connected in axis parallel relationship through the axial groove 14 which is defined at the outer end of the stack of stampings 11 and they are held by a stiff insulating blade 39 in the slot 14. The blade 39 also serves as an insulating slot seal and constitutes an insulation between the windings and the stampings 11 and a metal slot seal or tooth wedge 40. The cords 37 and 38 are conducted through the oepning 29 of the bottom winding coverplate 25 and they are bent off a second time from the vertical axis about the noses 30 and 31 into the horizontal direction indicated by the arrow 41.

In the embodiment of FIGS. 1 to 5, the terminal ends of the cords 37 and 38 with their clamp plates 32 and 33 are bent substantially at right angles to the axis of the cord which passes through the stator and the clamp plates 32 and 33 extend substantially radially in the cavities 23 and 24, respectively. The clamp plates 32 and 33 are held firmly in the pocket-type cavities by upwardly pointing projections 27 on the bottom wall 26 of each cavity which extend behind the clamp plates 32 and 33, as shown particularly in FIG. 5. In addition, to the securement of the ends by the projections 27, the ends are also secured by their right angle formation at the end of the cords 37 and 38.

With the invention, therefore, the ends of the cords 37 and 38 which are connected to the winding ends are thus bent off by at least 90° against possible loosening in the direction of traction so that a tractive force acting downwardly in an axial direction on the cords 37 and 38 cannot have an adverse effect on the winding ends at the junction of the winding ends with the cords. In addition, the winding ends are sufficiently reinforced by the clamp plates 32 and 33. This reinforcement can also be achieved, for example, by a moderate application of tin solder but the use of clamp plates is more advantageous and is simpler.

If a force should act on the cords 37 and 38 in the direction of the arrow 41, this force is absorbed mostly by the noses 30 and 31 of the bottom winding coverplate 25. The remaining portion of the tractive force which acts in an axial direction is absorbed by the bottom wall 26 of the cavities and the projecting ribs 27. The clamp plates 32 and 33 may be loosely placed into the pocket-type cavities 23 and 24 and their position is fully secured by the projecting ribs 27.

As is best illustrated in FIG. 5, the insulating blade 39, which also covers the connecting points of the cords, holds the cords 37 and 38 in the cavities 23 and 24 with a certain radial inwardly directed pressure. In the alternate embodiment indicated in FIGS. 6 and 7, a tongue 45 presses on the cords 37, 38 and with such a construction, the projecting ribs 27 are not required.

In the construction of FIGS. 6 and 7, there is provided a coverplate 22' which includes a tongue 45 formed in a thinner zone 46 and which has a narrower extension 47. The tongue 45 is bent off by 90° because of the weakened area or thin zone 46 in the direction of the arrow shown in FIG. 6 so that it covers the upper cord ends and holds them under light pressure in the cavities 23' and 24'. An insulating blade 39' provides an insulation between the winding wire and the stack of stampings 11 or slot key 40. The blade 39' is shorter than, and is located inside of, the cords 37' and 38' and can be introduced more easily than in the embodiment shown in FIG. 5, before the coverplate 22' is attached. The tongue 45 with its extension 47 is held in a bent-off position by a subsequently inserted slot key 40.

In the case of an embodiment with several winding groups 12', 13', etc., as shown in FIG. 8, and which are connected with each other in any desired manner, a corresponding number of evenly distributed pocket-type cavities is provided, for example, cavities which are located over the circumference of the winding coverplate 22''. These cavities, 23' and 24' as well as any number of additional ones, can be arranged in an advantageous manner either radially on the winding coverplate, as shown in FIGS. 1 to 7, or as indicated in FIG. 8, axially on the cylindrical extension 17. In the embodiment of FIG. 8, the cavities 23' and 24' are arranged axially and opened at their end face and the cord ends are bent off several times around the exterior of the part forming the cavities 23' and 24'. In this construction, a tractive force can no longer act on the junctions between the cord ends and the winding ends which are also placed on the cavities 23' and 24', since the multiple bends of the cords around the walls of the parts forming the cavities ensure secure anchoring of the ends.

Thus, the invention provides simple means to ensure the definite positioning of the sensitive junctions between the electrical connecting cord ends and the winding coils of an electric motor. Thus, the reliable insulation and mechanical anchoring of the cord ends is ensured in a very simple and economical manner. This means a substantial cost reduction in the application of the cords to the motors, as well as a substantial simplification and improvement in the manner in which the cords are connected.

While specific embodiments of the invention have been shown and described in detail to illustrate the application of the principles of the invention, it will be understood that the invention may be embodied otherwise without departing from such principles.

What is claimed is:

1. In a small size electric motor having a stator, including a magnetic structure formed with axially extending slots and stator coils extending in the slots, and an external rotor rotatably surrounding the stator, an arrangement for the traction relief of the connections between the terminal ends of the conductors of a supply cord and the terminal ends of the stator coils comprising, at one axial end of said stator, uniformly angularly spaced cavities receiving the respective terminal ends of said stator coils; a supply cord extending through at least one of said slots from the opposite axial end of said stator to said one axial end thereof and having the terminal ends of its conductors bent at at least 90° to the axis of said stator and inserted into said cavities and connected therein to the terminal ends of said stator coils; and means maintaining the bent terminal ends of said conductors in said cavities.

2. An arrangement, according to claim 1, wherein the said terminal ends interconnected with metal clamp plates.

3. An electric motor construction, particularly an external rotor-type motor, comprising a stator having a plate stack core and coil windings with contact ends, a rotor, means rotatably supporting said rotor for cooperative rotation in respect to said stator, plate means adjacent one end of said stator including a part defining a cord-receiving pocket, a connecting cord extending along said stator and having a terminal end disposed at an angle in respect to the remainder of said cord and engaged in said pocket, said coil winding contact ends being located in said pocket and connected to said terminal ends, and means associated with said pocket for holding said terminal ends therewithin.

4. An electric motor construction, according to claim 3, wherein said plate means comprises a winding cover at one end of said stator, said cover having a radially opening pocket for each terminal end, each pocket having an inwardly extending projection engaged with the terminal ends and comprising said means for holding said terminal ends in said cavity.

5. An electric motor construction, according to claim 3, wherein said stator includes an axially extending cavity, said connecting cord extending through said cavity and having its terminal ends bent at a right angle to the axis of said cord in the cavity.

6. An electric motor construction, according to claim 3, wherein said plate means includes a plate at each end of said stator, one of said plates having an opening for the passage of said cord therethrough, the other of said plates defining said cavity for receiving the terminal end of said cord.

7. An electric motor construction, according to claim 3, wherein said plate means defines two separate cavities for each connecting cord, said connecting cord having two separate wire elements each with a separate terminal engaged in a separate cavity, said cavities being separated from each other by an insulating wall.

8. An electric motor construction, according to claim 3, wherein said plate means comprises a plate defining a plurality of cavities arranged around the circumference.

9. An electric motor construction, according to claim 3, wherein said plate means comprises a cylindrical extension arranged parallel to the motor axis.

10. An electric motor construction, according to claim 3, wherein said plate means comprises a stator coverplate having a plurality of pocket-type cavities with a phase partition therebetween.

11. An electric motor construction, particularly an external rotor-type motor, comprising a stator having a plate stack core and coil windings with contact ends, a rotor, means rotatably supporting said rotor for cooperative rotation in respect to said stator, plate means adjacent one end of said stator including a part defining a cord-receiving pocket, a connecting cord extending along said stator and having a terminal end disposed at an angle in respect to the remainder of said cord and engaged in said pocket, said coil winding contact ends being located in said pocket and connected to said terminal ends, and means associated with said pocket for holding said terminal ends therewithin; said plate means including a plate at each end of said stator, one of said plates having an opening for the passage of said cord therethrough, the other of said plates defining said cavity for receiving the terminal end of said cord; and a nose bounding each side of the opening in said one of said plates, said cord being deflected around the nose and being bent off from its axis at such location.

12. An electric motor construction, particularly an external rotor-type motor, comprising a stator having a plate stack core and coil windings with contact ends, a rotor, means rotatably supporting said rotor for cooperative rotation in respect to said stator, pleate means adjacent one end of said stator including a part defining a cord-receiving pocket, a connecting cord extending along said stator and having a terminal end disposed at an angle in respect to the remainder of said cord and engaged in said pocket, said coil winding contact ends being located in said pocket and connected to said terminal ends, and means associated with said pocket for holding said terminal ends therewithin; and a movable tongue arranged in the vicinity of the opening of said cavity and being engaged in the cavity to wedge the terminal end of the cord therein.

13. An electric motor construction, according to claim 12, wherein said tongue comprises an angled member engaged in a slot of said stator, and a slot key arranged in said slot with said angle member to hold it in position.

* * * * *